US011527971B2

(12) United States Patent
Kimura (10) Patent No.: US 11,527,971 B2
(45) Date of Patent: Dec. 13, 2022

(54) DRIVING APPARATUS AND DRIVING METHOD OF DC BRUSH MOTOR

(71) Applicants: Kabushiki Kaisha Toshiba, Tokyo (JP); Toshiba Electronic Devices & Storage Corporation, Tokyo (JP)

(72) Inventor: Hideki Kimura, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 283 days.

(21) Appl. No.: 17/007,783

(22) Filed: Aug. 31, 2020

(65) Prior Publication Data
US 2021/0297015 A1    Sep. 23, 2021

(30) Foreign Application Priority Data

Mar. 17, 2020  (JP) .............................. JP2020-046545

(51) Int. Cl.
| H02P 1/18 | (2006.01) |
| H02P 7/29 | (2016.01) |
| H02P 29/032 | (2016.01) |
| H02P 7/03 | (2016.01) |

(52) U.S. Cl.
CPC ................. *H02P 1/18* (2013.01); *H02P 7/04* (2016.02); *H02P 7/29* (2013.01)

(58) Field of Classification Search
CPC .. H02P 1/18; H02P 29/032; H02P 7/04; H02P 7/29
See application file for complete search history.

(56) References Cited

U.S. PATENT DOCUMENTS

| 2012/0082497 A1* | 4/2012 | Nagasaki ........... G03G 15/6544 227/7 |
| 2020/0039577 A1* | 2/2020 | Kataoka ................. B62D 6/008 |

FOREIGN PATENT DOCUMENTS

| CN | 103442967 A | * 12/2013 | ........... B62D 5/0484 |
| JP | 2004197644 A | * 7/2004 | .............. F04B 49/06 |
| JP | 2013-158086 A | 8/2013 | |
| JP | 2015-159630 A | 9/2015 | |
| JP | 2018-007371 A | 1/2018 | |

* cited by examiner

*Primary Examiner* — Thai T Dinh
(74) *Attorney, Agent, or Firm* — Allen & Overy LLP (57) ABSTRACT

According to an embodiment, a driving apparatus of a DC brush motor includes: a drive circuit that supplies motor current to a coil of a DC brush motor; and a control circuit configured to: after a predetermined time interval has elapsed since starting-up of the DC brush motor, drop down step-by-step a limit value that sets an upper limit of the motor current; and detect turning into a state where the motor current is limited by the limit value.

20 Claims, 6 Drawing Sheets

FIG.6

DRIVING APPARATUS AND DRIVING METHOD OF DC BRUSH MOTOR

CROSS-REFERENCE TO RELATED APPLICATIONS

This application is based upon and claims the benefit of priority from Japanese Patent Application No. 2020-046545, filed on Mar. 17, 2020; the entire contents of which are incorporated herein by reference.

FIELD

Embodiment described herein relates generally to a driving apparatus and a driving method of a DC brush motor.

BACKGROUND

Conventionally, there has been disclosed a technology that detects an output current supplied to a motor so as to detect an abnormality due to deterioration in a motor and/or a load machine. In many cases, an abnormality in a motor is due to deterioration caused by a long-time aging. It is difficult for a user to determine deterioration in a motor in some cases. On the other hand, if deterioration in a motor is appropriately presented to a user, the convenience is accordingly improved. A DC brush motor has characteristic features such as generation of rush current at its starting. In view of the features of the DC brush motor, there have been desired a driving apparatus and a driving method of a DC brush motor capable of easily detecting an abnormal state due to deterioration.

DETAILED DESCRIPTION

According to one aspect of the embodiment, a driving apparatus of a DC brush motor includes: a drive circuit that supplies motor current to a coil of a DC brush motor; and a control circuit configured to: after a predetermined time interval has elapsed since starting-up of the DC brush motor, drop down step-by-step a limit value that sets an upper limit of the motor current; and detect turning into a state where the motor current is limited by the limit value.

Exemplary embodiments of a driving apparatus and a driving method of a DC brush motor will be explained below in detail with reference to the accompanying drawings. The present disclosure is not limited to the following embodiments.

First Embodiment

Figure 1:
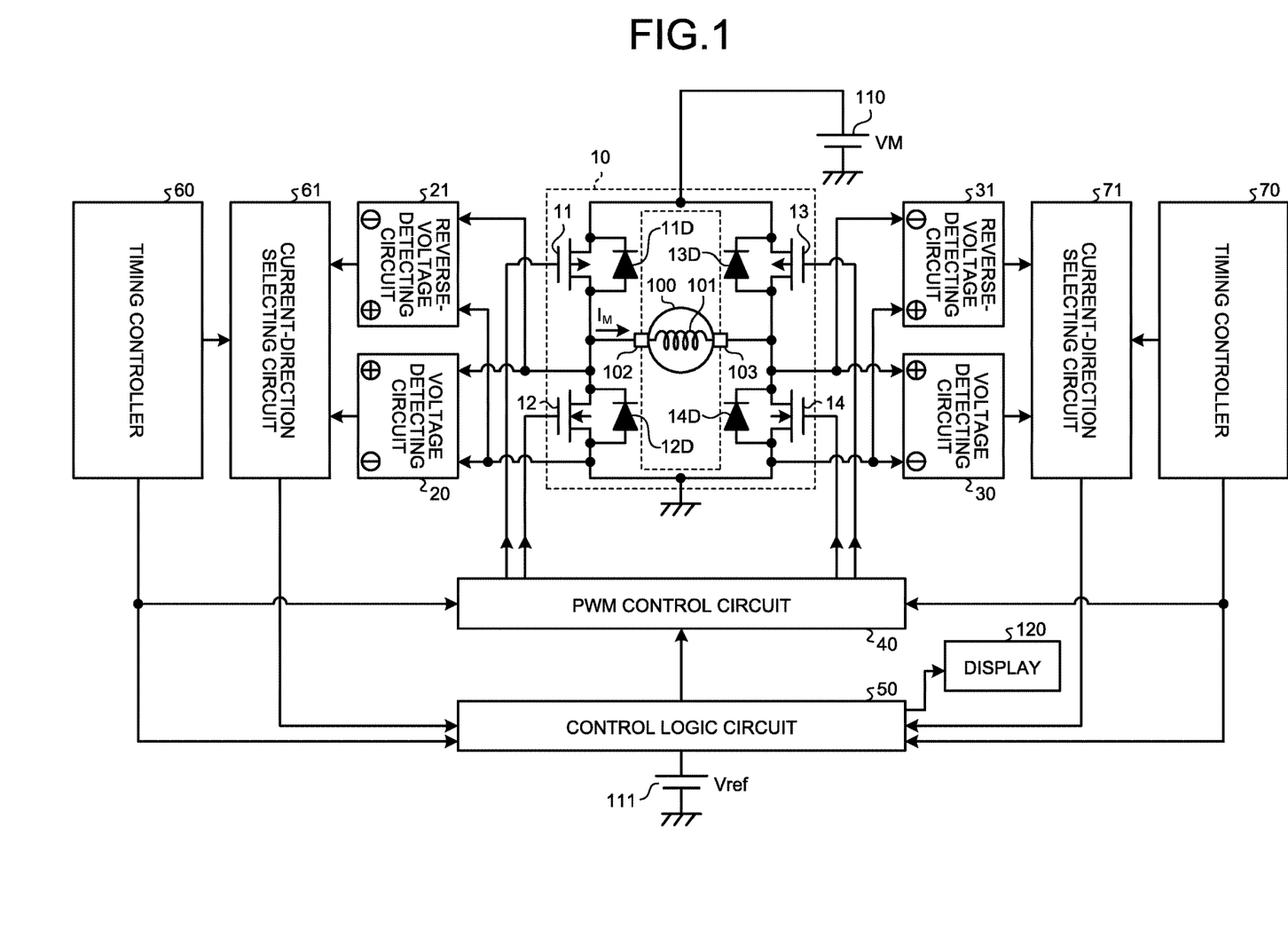
FIG. 1 is a diagram illustrating a driving apparatus of a DC brush motor according to a first embodiment.

FIG. 1 is a diagram illustrating a driving apparatus of a DC brush motor according to a first embodiment. The driving apparatus illustrated in FIG. 1 includes a drive circuit 10, voltage detecting circuits 20 and 30, reverse-voltage detecting circuits 21 and 31, a PWM control circuit 40, a control logic circuit 50, timing controllers 60 and 70, and current-direction selecting circuits 61 and 71.

The drive circuit 10 supplies, via brushes 102 and 103, motor current $I_M$ to a coil 101 provided in a rotor 100. There is illustrated in FIG. 1 a case where the motor current $I_M$ is supplied from the brush 102 side to the brush 103 side. The drive circuit 10 includes PMOS transistors 11 and 13 and NMOS transistors 12 and 14 that constitute an H-bridge circuit. The transistors 11 to 14 respectively include parasitic diodes 11D to 14D. A connection point between a drain of the transistor 11 and a drain of the transistor 12 is connected to the brush 102. A connection point of a drain of the transistor 13 and a drain of the transistor 14 is connected to the brush 103. Motor voltage VM is supplied to the drive circuit 10 by a power source 110.

The control logic circuit 50 controls the PWM control circuit 40 in response to signals supplied from the current-direction selecting circuits 61 and 71 and the timing controllers 60 and 70. The control logic circuit 50 generates, by using a reference voltage Vref supplied from a voltage circuit 111, a limit value for setting an upper-limit value of the motor current $I_M$. The control logic circuit 50 A/D-converts a value of the reference voltage Vref, for example, and executes operation using a predetermined factor so as to generate a voltage corresponding to the limit value. The limit value and the value of the voltage generated in accordance with the limit value are stored in a built-in memory (not illustrated). The control logic circuit 50 compares, with a voltage corresponding to the limit value, detection voltages of the voltage detecting circuits 20 and 30 and the reverse-voltage detecting circuits 21 and 31 that are supplied via the current-direction selecting circuits 61 and 71. In accordance with the comparison result, the control logic circuit 50 supplies, to the PWM control circuit 40, a signal for controlling a duty ratio of a PWM signal. The control logic circuit 50 may be constituted of a microcomputer, for example.

When a control signal is supplied from the control logic circuit 50, the PWM control circuit 40 outputs a PWM signal whose duty ratio is adjusted in accordance with the control signal. The PWM control circuit 40 supplies PWM signals to respective gates of the transistor 11 to 14 so as to control turning ON/OFF of the transistors 11 to 14. Thus, the PWM control circuit 40 controls the motor current $I_M$ so as to control a rotation direction and a rotation speed of the rotor 100.

The voltage detecting circuits 20 and 30 detect source-drain voltages of the transistors 12 and 14 with reference to their source voltages. The source-drain voltages of the transistors 12 and 14 are voltage drops due to ON-resistances of the transistors 12 and 14 generated in response to the motor current $I_M$. Thus, the voltage detecting circuit 20 detects a voltage drop of the transistor 12 that is generated by the motor current $I_M$ flowing from the brush 103 side to the brush 102 side. The voltage detecting circuit 30 detects a voltage drop of the transistor 14 generated by the motor current $I_M$ flowing from the brush 102 side to the brush 103 side. The voltage drops in the transistors 12 and 14 are generated in response to the motor current $I_M$, so that it is possible to detect the motor current $I_M$ on the basis of values of voltage drops in the transistors 12 and 14.

The reverse-voltage detecting circuits 21 and 31 detect source-drain voltages of the transistors 12 and 14 with reference to their drain sides. In other words, each of the reverse-voltage detecting circuits 21 and 31 detects reverse voltage generated, by drain current flowing from a corresponding source to a corresponding drain in a reverse direction, between the source and the drain. For example, there presents a case where the motor current $I_M$ falls below zero under a control for limiting an upper-limit value of the motor current $I_M$, and thus rotation of the rotor 100 is accelerated in a reverse direction. When the reverse-voltage detecting circuits 21 and 31 detect reverse voltages, the control logic circuit 50 controls the PWM control circuit 40 so as to prevent a state where rotation of the rotor 100 is accelerated in a reverse direction. Hereinafter, a rotation speed of the rotor 100 may be referred to as a rotation speed of a motor.

In accordance with the control of the timing controllers 60 and 70, the current-direction selecting circuits 61 and 71 supply, to the control logic circuit 50, detection voltages of the voltage detecting circuits 20 and 30 and the reverse-voltage detecting circuits 21 and 31. When detecting voltages with references to source sides of the transistors 12 and 14, the timing controllers 60 and 70 select the voltage detecting circuits 20 and 30, and when detecting voltages with references to drain sides of the transistors 12 and 14, the timing controllers 60 and 70 select the reverse-voltage detecting circuits 21 and 31.

The timing controller 60 controls a timing at which the current-direction selecting circuit 61 supplies, to the control logic circuit 50, detection voltages of the voltage detecting circuit 20 and the reverse-voltage detecting circuit 21 and a timing at which the control logic circuit 50 changes a limit value of the motor current $I_M$. Similarly, the timing controller 70 controls a timing at which the current-direction selecting circuit 71 supplies, to the control logic circuit 50, detection voltages of the voltage detecting circuit 30 and the reverse-voltage detecting circuit 31 and a timing at which the control logic circuit 50 changes a limit value of the motor current $I_M$. For example, a deteriorated state of a motor detected by the control logic circuit 50 is displayed on a display 120. Note that a timing at which a limit value of the motor current $I_M$ is changed may be set by the control logic circuit 50.

Figure 2A:
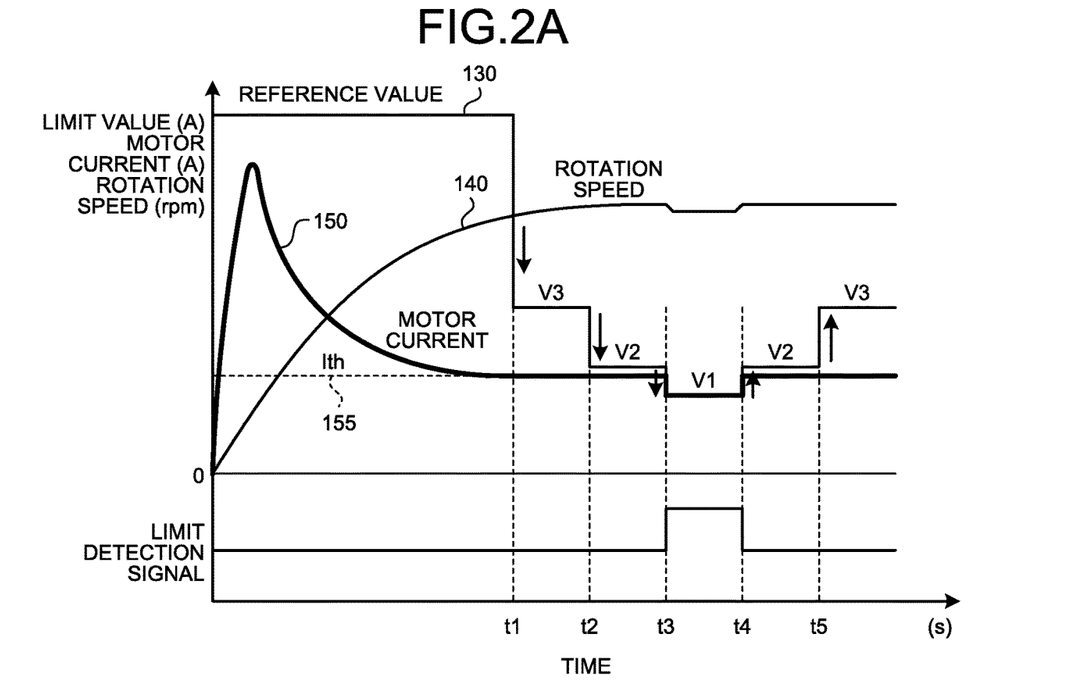
FIGS. 2A and 2B are diagrams illustrating driving methods of the driving apparatus of the DC brush motor.

A driving method according to the present embodiment will be explained with reference to FIGS. 2A and 2B. FIG. 2A is a diagram illustrating a driving method in an early stage where a DC brush motor is not deteriorated. For example, the driving method is executed on shipping where deterioration is not started so as to acquire basic data. Hereinafter, a DC brush motor may be simply referred to as a motor. The lateral axis indicates a time. A solid line 130 indicates a limit value of motor current, a solid line 140 indicates a rotation speed of a motor, and a solid line 150 indicates the motor current $I_M$. At starting of the motor, back electromotive force is not generated in the coil 101, and thus the power-source voltage VM is applied to the coil 101 as it is, so that rush current flows. Afterwords, a value of the motor current $I_M$ is reduced and stabilized due to back electromotive force generated in the coil 101 in accordance with a rotation speed of the motor. Note that a limit value at starting of the motor may be set to a reference value that is higher than an upper-limit value of a supposed rush current, for example.

A limit value is dropped from the reference value down to a limit value V3 at a timing t1 when the motor current $I_M$ becomes stable. In other words, there is turned into a state where an upper-limit value of the motor current $I_M$ is limited by the limit value V3. A time interval of rush current may be decided from a starting time point to a time point when the motor current $I_M$ falls lower than a previously-set threshold value Ith that is indicated by using a dashed line 155, for example. A detection voltage is compared with a voltage corresponding to the threshold value Ith, which has been stored in the control logic circuit 50. Thus, there may be detected the timing t1 at which the motor current $I_M$ falls down to the threshold value Ith. Note that in a state where the motor current $I_M$ is stable, a rotation speed of the motor is also stable. Thus, a timing at which a rotation speed of the motor is stable or a timing at which both of the motor current $I_M$ and the rotation speed of the motor are stable may be the timing t1. There may be employed a configuration in which a rotation speed of the motor is detected by a tachometer (not illustrated) and a detection result is supplied to the control logic circuit 50.

The control logic circuit 50 compares a detection voltage with a voltage value corresponding to the limit value V3 so as to detect whether or not the motor current $I_M$ reaches the limit value V3. As a result of the comparison, the motor current $I_M$ does not reach the limit value V3, and thus the control logic circuit 50 drops the limit value down to a limit value V2 at a timing t2. The motor current $I_M$ does not reach the limit value V2, and thus the control logic circuit 50 drops the limit value down to a limit value V1 at a timing t3. As a result of the comparison, the motor current $I_M$ reaches the limit value V1, and thus a limit detection signal illustrated in a lower part is turned into an H level. The control logic circuit 50 controls the PWM control circuit 40 to execute a constant current operation in which the motor current $I_M$ is limited by the limit value V1.

The control logic circuit 50 supplies, to the PWM control circuit 40, a control signal for adjusting, in accordance with the limit value V1, a duty ratio of a PWM signal. The PWM control circuit 40 supplies, to the drive circuit 10, the PWM signal whose duty ratio is adjusted in accordance with the limit value V1. Turning ON/OFF of each of the transistors 11 to 13 in the drive circuit 10 is controlled by a corresponding PWM signal whose duty ratio is adjusted in accordance with the limit value V1. Thus, there is executed a constant current operation that is controlled by using the limit value V1. A detection voltage and a voltage corresponding to the limit value V1 are compared with each other in the control logic circuit 50, so that it is possible to detect execution of the constant current operation using the limit value V1. A rotation speed of the motor is changed in interlocking with the motor current $I_M$ that is limited by the limit value V1.

Subsequently, the limit value is increased up to the limit value V2 at a timing t4. The motor current $I_M$ is lower than the limit value V2, thus a limit detection signal becomes L level at the timing t4, and the constant current operation using the limit value V1 is ended. Subsequently, the limit value is increased up to the limit value V3 a timing t5. The limit value is set to the limit value V3 having a sufficient margin for the motor current $I_M$, so that it is possible to tolerate fluctuation in the motor current $I_M$ due to load change. Thus, it is possible to shift to a stable motor drive in which a rotation speed of the motor follows load change.

The limit value V1 by using which the constant current operation is executed and the timing t3 from which the constant current operation is executed are basic data indicating a drive state of the motor that has not been deteriorated. When an end of the constant current operation is detected at the timing t4, for example, it is possible to grasp that actual used current of the motor in an unloaded state is between the limit values V1 and V2. It becomes basic data on actual used current of the motor that has not been deteriorated.

Figure 2B:
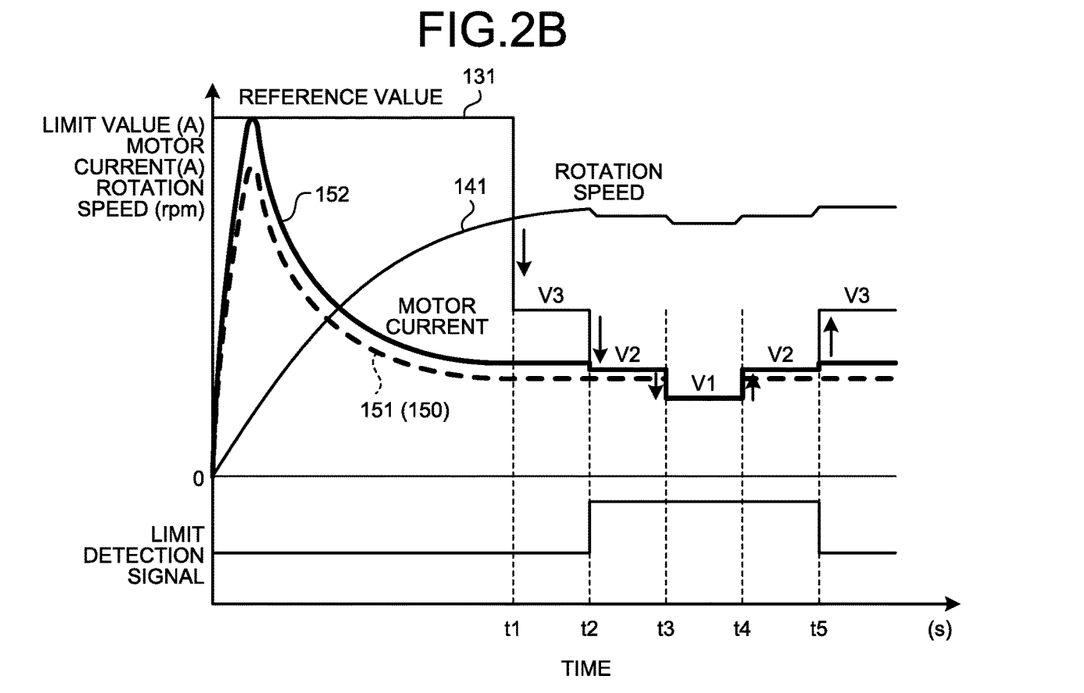

FIG. 2B is a diagram illustrating a driving method for detecting a deterioration state of a motor by using comparison with the basic data acquired in the driving method illustrated in FIG. 2A. A solid line 131 indicates a limit value of the motor current $I_M$, a solid line 141 indicates a rotation speed of the motor, and a solid line 152 indicates the motor current $I_M$. A dashed line 151 corresponds to the solid line 150 illustrated in FIG. 2A. The timings t1 to t5 respectively correspond to the timings t1 to t5 illustrated in FIG. 2A.

Similarly to FIG. 2A, the limit value is dropped from the reference value down to the limit value V3 at the timing t1 from which a rotation speed of the motor is stable. Under a state of the limit value V3, the control logic circuit 50 detects whether or not a constant current operation is executed in the drive circuit 10. The motor current $I_M$ is smaller than the limit value V3, and thus it is determined that a constant current operation using the limit value V3 is not executed. Thus, a limit detection signal illustrated in the lower part is turned into an L level.

Subsequently, the limit value is dropped to the limit value V2 at the timing t2. In the illustrated example, the motor current $I_M$ is increased due to deterioration, and thus the motor current $I_M$ reaches the limit value V2. Therefore, there is executed a constant current operation that is controlled by using the limit value V2, and thus the motor current $I_M$ is reduced. A limit detection signal is turned into an H level at the timing t2. In other words, a constant current operation is executed from the timing t2 that is prior to the timing t3 from which a constant current operation is executed in a motor that has not been deteriorated. Thus, when the timing t2 at which a detection signal is output and the timing t3 in the basic data are compared with each other, it is possible to determine a deteriorated state of the motor.

Subsequently, the limit value is dropped down to the limit value V1 at the timing t3. The motor current $I_M$ reaches the limit value V1, and thus a constant current operation using the limit value V1 is executed. The limit detection signal is kept to be H level. Subsequently, the limit value is increased up to the limit value V2 at the timing t4. The motor current $I_M$ reaches the limit value V2, and thus a constant current operation using the limit value V2 is executed. The limit detection signal is kept to be H level. Subsequently, the limit value is increased up to the limit value V3 at the timing t5. The motor current $I_M$ does not reach the limit value V3, the constant current operation using the limit value V3 is not executed, and thus the limit detection signal is turned into an L level. A rotation speed of the motor is changed in interlocking with the motor current $I_M$ that is limited by the limit values V1 and V2.

When the motor is deteriorated, the motor current $I_M$ is increased. Thus, when there is executed comparison with basic data indicating a drive state of a motor that has not been deteriorated, it is possible to grasp the extent of deterioration in the motor. For example, in a case of a state without deterioration, the constant current operation using the limit value V2 is not executed on a motor. On the other hand, when deterioration has progressed, the constant current operation using the limit value V2 is executed on the motor. Thus, when the limit value V1 of basic data in which a constant current operation is executed in a case where there presents no deterioration is compared with the limit value V2 in a case where a constant current operation is executed after the motor is started to use, a deteriorated state in the motor is able to be grasped. Moreover, whether or not the motor current $I_M$ reaches a limit value is able to be digitally determined by whether or not a limit detection signal is turned into an H level, and thus determination of a deteriorated state in the motor is easy. Furthermore, when the limit detection signal is displayed on the display 120, it is possible to inform a user of a state of deterioration in the motor.

Note that in the embodiment, the limit value is dropped down step-by-step from the reference value; however, when limit values, the number of steps for step-by-step changing the limit value, and timings for changing the limit values are appropriately set, the versatility is able to be improved. Moreover, when comparison with the basic data is automatically executed at starting of a motor and the result is displayed on the display 120, it is possible to inform a user of information on deterioration in the motor in a timely manner.

Figure 3:
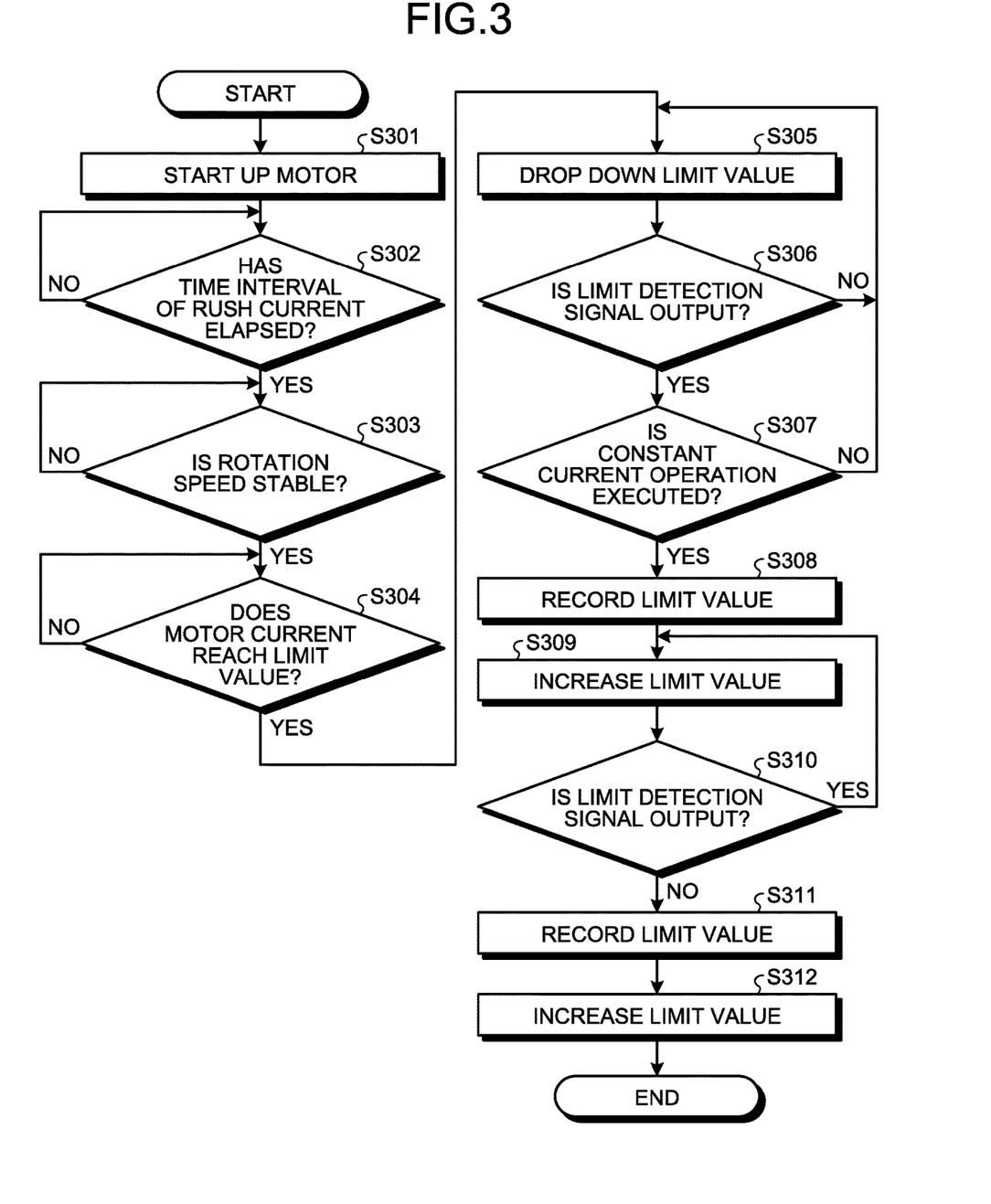
FIG. 3 is a flowchart illustrating the driving method of the DC brush motor.

FIG. 3 is a flowchart illustrating the driving method of the motor illustrated in FIG. 2A. A motor is started up (S301). When a time interval of rush current generated at starting has elapsed (Step S302: Yes), whether or not a rotation speed of the motor is stable is determined (Step S303). For example, by using a signal sent from a not-illustrated tachometer, whether or not a rotation speed of the motor is stable is determined. When a time interval of the rush current has not been elapsed (Step S302: No), passage of the time interval of the rush current is waited.

When a rotation speed of the motor is stable (Step S303: Yes), whether or not the motor current $I_M$ reaches a limit value is determined (Step S304). When a rotation speed of the motor is not stable (Step S303: No), stabilization of a rotation speed of the motor is waited. When the motor current $I_M$ reaches a limit value (Step S304: No), a state where the motor current $I_M$ does not reach the limit value is waited.

When the motor current $I_M$ does not reach a limit value (Step S304: Yes), the limit value is dropped down (Step S305). The motor current $I_M$ is detected by using the dropped-down limit value, and presence/absence of an output of a limit detection signal is determined (Step S306). When a limit detection signal is not output (Step S306: No), in other words, when a limit detection signal is L level, the limit value is dropped down (Step S305).

When a limit detection signal is output (Step S306: Yes), in other words, when a limit detection signal is H level, whether or not a constant current operation using the limit value is executed is determined (Step S307). When a constant current operation using a limit value is not executed (Step S307: No), the limit value is dropped down (Step S305). When a constant current operation using a limit value is executed (Step S307: Yes), the limit value V1 at the time point is recorded (Step S308).

Subsequently, the limit value is increased (Step S309), and presence/absence of an output of a limit detection signal is determined (Step S310). When a limit detection signal is not output (Step S310: No), the limit value V2 at the time point is recorded (Step S311). When a limit detection signal is output (Step S310: Yes), the limit value is increased (Step S309).

After the limit value V2 is recorded (Step S311), the limit value is further increased (Step S312). As described above, the limit value is increased up to the limit value V3 having a sufficient margin for the limit value V2. Thus, it is possible to shift to a normal drive state in which the motor current $I_M$ is not limited by the limit value.

Note that the limit value may be dropped down in an analogue manner after a time interval of rush current has elapsed, so as to record a limit value when the motor current $I_M$ responds thereto. The detection voltage and a voltage corresponding to the limit value are compared with each other in the control logic circuit 50 so as to detect a limit detection signal, and thus a limit value to which the motor current $I_M$ responds is able to be detected.

Figure 4:
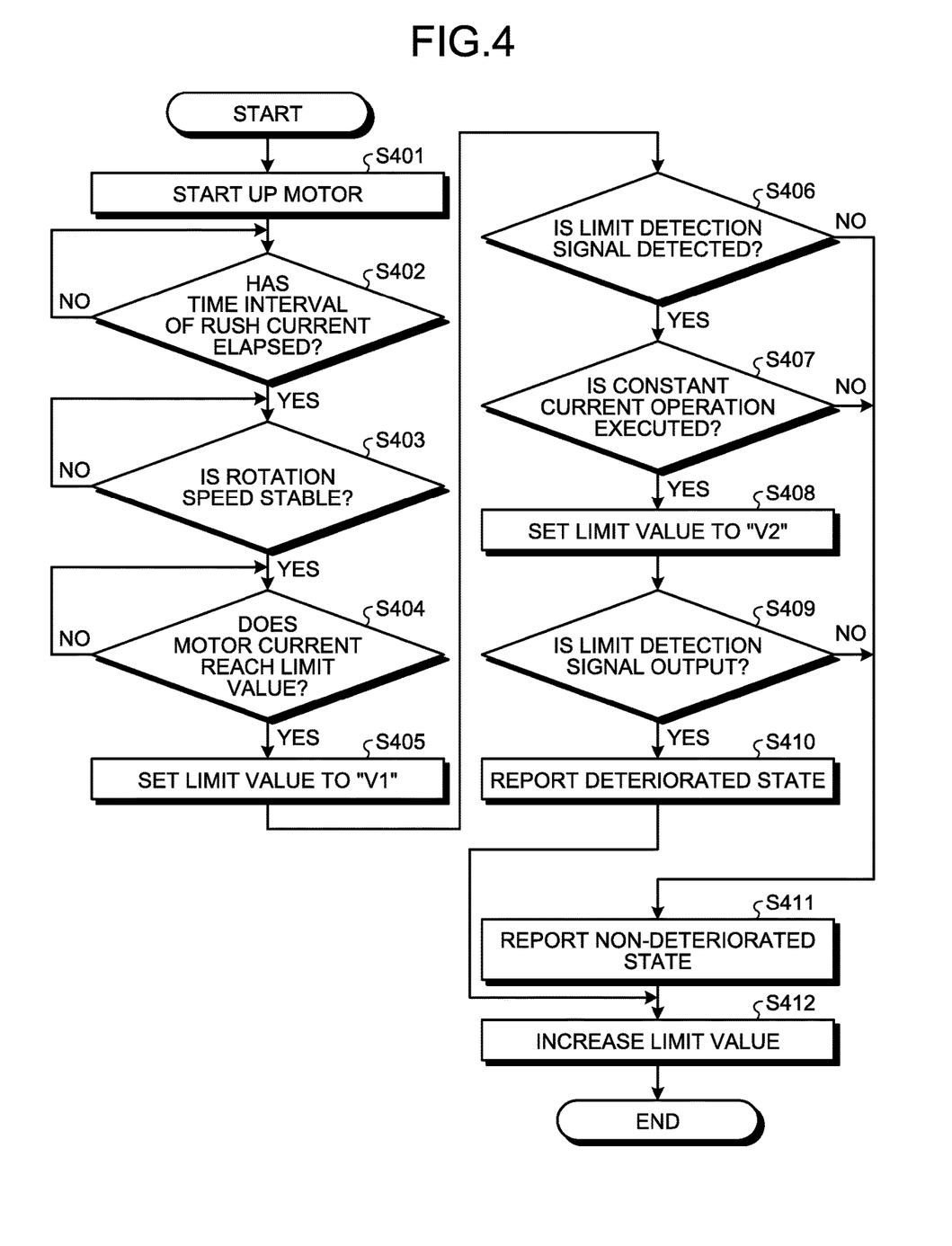
FIG. 4 is another flowchart illustrating the driving method of the DC brush motor.

FIG. 4 is a diagram illustrating a flow based on the driving method illustrated in FIG. 2B. Note that the data on the limit values V1 to V3 and the timings t1 to t5, which are acquired in the driving method illustrated in FIG. 3 is stored in the control logic circuit 50, for example. A motor is started up (Step S401), and whether or not a time interval of rush current has elapsed is determined (Step S402). When a time interval of rush current has elapsed (Step S402: Yes), whether or not a rotation speed of the motor is stable is determined (Step S403). When a time interval of rush current has not elapsed (Step S402: No), passage of the time interval of rush current is waited.

When a rotation speed of the motor is stable (Step S403: Yes), whether or not the motor current $I_M$ reaches a limit value is determined (Step S404). A limit value at starting of the motor has been set to a reference value, for example. When the motor current $I_M$ reaches a limit value (Step S404: No), a state in which the motor current $I_M$ does not reach the limit value is waited. When a rotation speed of the motor is not stable (Step S403: No), a state in which the rotation speed of the motor is stable is waited.

When the motor current $I_M$ does not reach a limit value (Step S404: Yes), the limit value is dropped down step-by-step to the limit values V3 and V2 at the timings t1 and t2, respectively, and is set to the limit value V1 at the timing t3 (Step S405). When a limit detection signal is detected (Step S406: Yes) and further when a constant current operation using the limit value V1 is executed (Step S407: Yes), the limit value is increased up to the limit value V2 (Step S408). When a limit value is increased up to the limit value V2 and whether or not a limit detection signal is output is detected, a deteriorated state of the motor is able to be determined. When a limit detection signal is not detected (Step S406: No) and when a constant current operation is not executed (Step S407: No), a non-deteriorated state is reported (Step S411).

When a limit detection signal is output (Step S409: Yes), a deteriorated state is reported (Step S410). For example, occurrence of deterioration is displayed on the display 120. When a limit detection signal is not detected (Step S409: No), a non-deteriorated state is reported (Step S411).

Subsequently, the limit value is increased (Step S412). The limit value is increased up to the limit value V3 having a sufficient margin for the limit value V2. Thus, it is possible to shift to a normal drive state in which the motor current $I_M$ is not limited by the limit value.

Determination (Step S406) of whether or not a limit detection signal is output at the timing t1 and the limit value V3 may be executed without executing the determinations of the Steps S402 to S404. Moreover, the determination may be executed, not in a normal state, but in a stable state at starting of the motor in which fluctuation in a load is little. For example, a deteriorated state of the motor may be effectively determined during a short time interval from starting up of the motor to the timing t5.

In a case of a motor that has not deteriorated, a limit detection signal is detected at the limit value V1, on the other hand, in a case of a motor whose deterioration has progressed, limit detection signals are output at the limit values V1 and V2. The control logic circuit 50 compares the basic data and the detection data with each other so as to determine a deteriorated state of the motor. When comparison between the basic data and the detection data is automatically executed at starting of the motor and causes the display 120 to display the result, it is possible to inform a user of a deteriorated situation of the motor in a timely manner.

When a limit detection signal is output (Step S409: Yes), control for stopping a drive operation of a motor may be executed along with the notification of deterioration (Step S410). When a motor drive is automatically stopped, increase in power consumption due to use of a deteriorated motor is able to be reduced. Moreover, the display 120 may display the fact that the motor needs maintenance so as to call for attention of a user.

Figure 5:
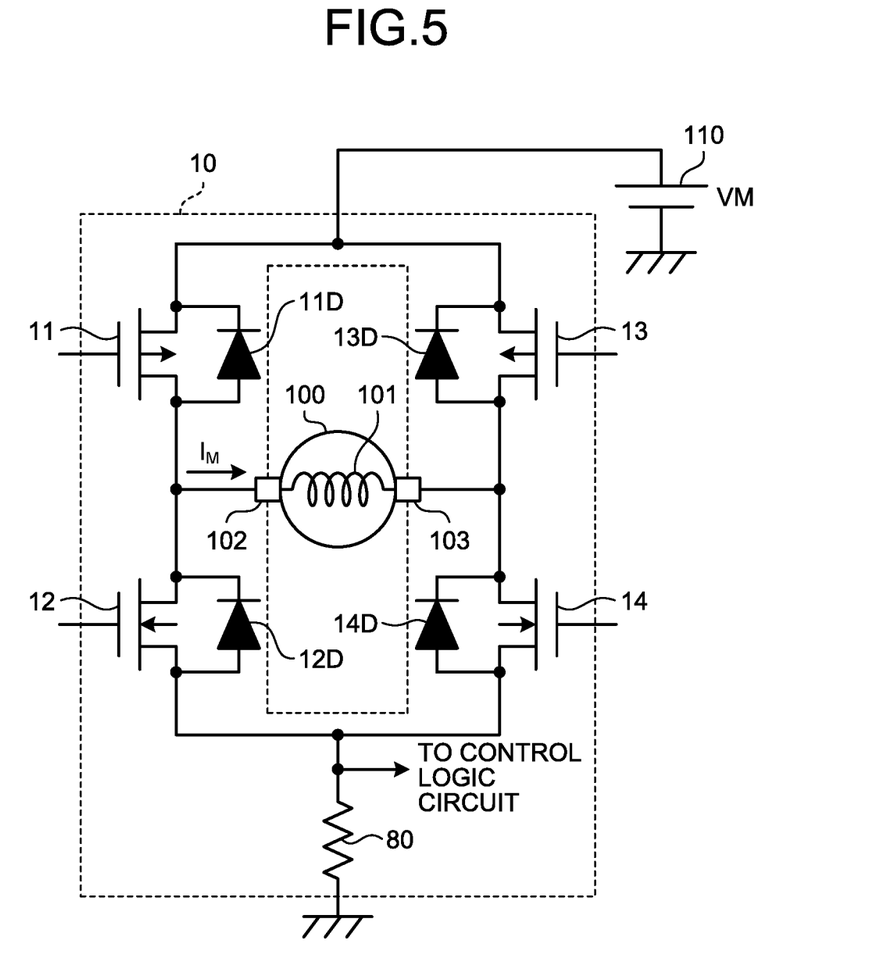
FIG. 5 is a diagram illustrating one embodiment for detecting motor current of the DC brush motor.

FIG. 5 is a diagram illustrating another configuration example of the drive circuit 10. The drive circuit 10 illustrated in FIG. 5 includes a resistance 80 that is connected between the ground and sources of the transistors 12 and 14. The motor current $I_M$ is supplied to the resistance 80 via the transistor 12 or 14. Therefore, a voltage drop generated in the resistance 80 is corresponding to a voltage according to the motor current $I_M$. When a value of the voltage drop generated in the resistance 80 is supplied to the control logic circuit 50, the motor current $I_M$ is able to be detected.

Figure 6:
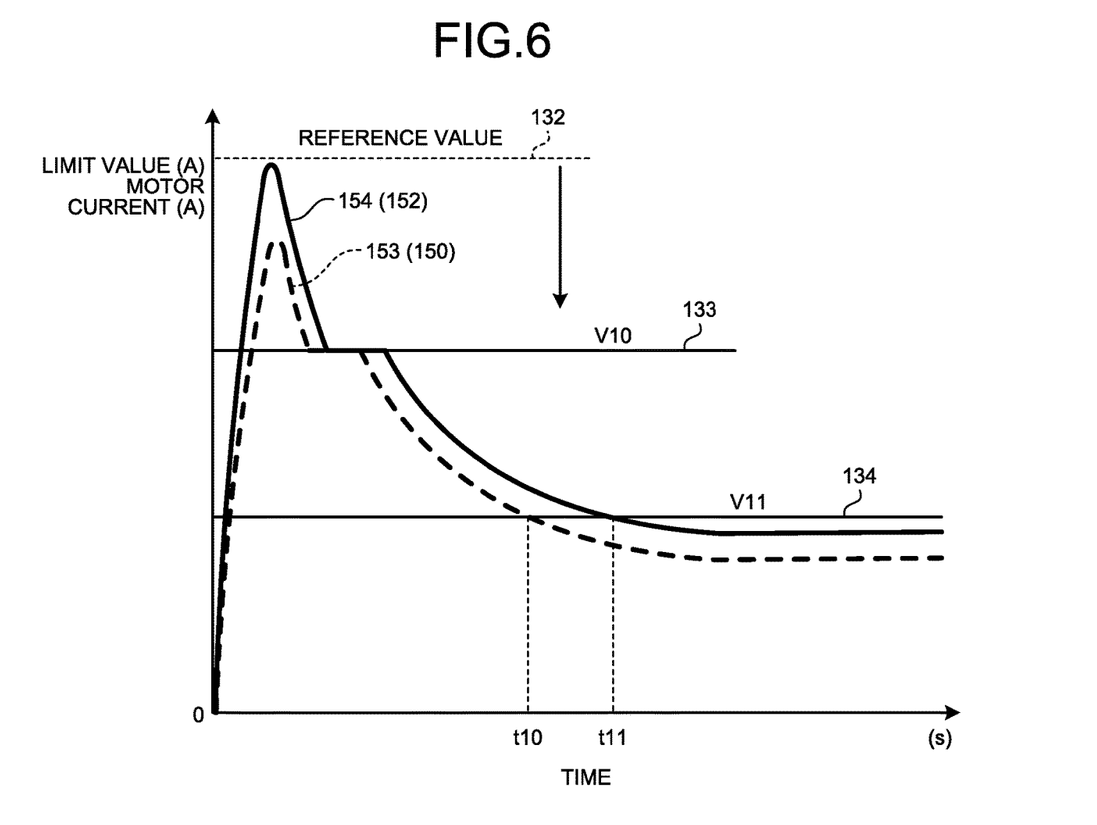
FIG. 6 is a diagram illustrating another driving method for detecting a deteriorated state of the driving apparatus of the DC brush motor.

FIG. 6 is a diagram illustrating another driving method for detecting a deteriorated state of a motor. The lateral axis indicates a time, and the vertical axis indicates a limit value and the motor current $I_M$. A dashed line 132 indicates a reference value of the limit value, and the reference value corresponds to the reference values illustrated in FIGS. 2A and 2B. A dashed line 153 corresponds to the solid line 150 illustrated in FIG. 2A, and indicates the motor current $I_M$ of a motor that has not deteriorated. A solid line 154 corresponds to the solid line 152 illustrated in FIG. 2B, and indicates the motor current $I_M$ of a motor whose deterioration has progressed.

In FIG. 6, at starting, a limit value V10 indicated by a solid line 133 is set, which is lower than the reference value. In other words, rush current is limited by the limit value V10.

The motor current $I_M$ limited by the limit value V10 is reduced by work of back electromotive force of the coil 101. When deterioration has progressed in a motor, the motor current $I_M$ is larger than a case where deterioration has not progressed. Therefore, depending on a progress state of deterioration in the motor, difference is generated in a time interval from a time point at which the motor current $I_M$ is started to reduce to a time point at which the motor current $I_M$ becomes a value of a reference value V11 that is set for comparison and is indicated by using a solid line 134. For example, when deterioration is generated in a motor, a timing at which the motor current $I_M$ is dropped down to the reference value V11 is more delayed than a case where deterioration has not been generated. Thus, a timing at which the motor current $I_M$ drops down to the reference value V11 is able to be measured by the control logic circuit 50 so as to detect a deteriorated state of the motor. For example, the control logic circuit 50 uses a timing t10 as a reference time point of the basic data, and when a time interval between the timing t10 and a timing t11 is longer than a predetermined threshold time interval, determines that deterioration in the motor has progressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A driving apparatus of a DC brush motor, the apparatus comprising:
    a drive circuit that supplies motor current to a coil of a DC brush motor; and
    a control circuit configured to:
        after a predetermined time interval has elapsed since starting-up of the DC brush motor, drop down step-by-step a limit value that sets an upper limit of the motor current; and
        detect turning into a state where the motor current is limited by the limit value.

2. The driving apparatus of the DC brush motor according to claim 1, wherein
    the predetermined time interval is a time interval until a time point at which the motor current at starting of the DC brush motor is reduced to a preset threshold value.

3. The driving apparatus of the DC brush motor according to claim 1, wherein
    the limit value at starting of the DC brush motor is set to a value that is larger than an upper-limit value of rush current.

4. The driving apparatus of the DC brush motor according to claim 1, further comprising:
    a PWM control circuit that supplies a PWM signal for controlling turning ON/OFF of a switching element of the drive circuit.

5. The driving apparatus of the DC brush motor according to claim 4, wherein
    the control circuit detects the motor current based on a value of a voltage drop generated in the switching element.

6. The driving apparatus of the DC brush motor according to claim 4, wherein
    the control circuit adjusts a duty ratio of the PWM signal in accordance with the limit value.

7. The driving apparatus of the DC brush motor according to claim 1, wherein
    the control circuit detects the motor current based on a value of a voltage drop generated in a resistance that is connected to the drive circuit.

8. The driving apparatus of the DC brush motor according to claim 1, further comprising:
    a timing controller that controls a timing at which the limit value is step-by-step dropped down.

9. The driving apparatus of the DC brush motor according to claim 1, wherein
    after turning into a state where the motor current is controlled by the limit value, the control circuit executes control for increasing the limit value.

10. The driving apparatus of the DC brush motor according to claim 1, further comprising:
    a display, wherein
    the control circuit outputs a detection signal that indicates turning into the state where the motor current is limited by the limit value, and
    the display responds to the detection signal.

11. The driving apparatus of the DC brush motor according to claim 1, wherein
    the control circuit stores therein, as basic data, timings for step-by-step dropping down the limit value and each of the limit value at the respective timings.

12. The driving apparatus of the DC brush motor according to claim 11, wherein
    the basic data includes initial data on a limit timing of turning into a state where the motor current is limited by the limit value and the limit value at the limit timing.

13. The driving apparatus of the DC brush motor according to claim 12, wherein
    the control circuit is further configured to:
        output a detection signal that indicates turning into the state where the motor current is limited by the limit value; and
        determine a state of the DC brush motor in accordance with a context between a timing at which the detection signal is output and the limit timing in the initial data.

14. A drive method of a DC brush motor, the method comprising:
    starting up a DC brush motor;
    after a predetermined time interval has elapsed since starting-up of the DC brush motor, dropping down step-by-step a limit value that sets an upper limit of motor current supplied to a coil of the DC brush motor; and
    detecting turning into a state where the motor current is limited by the limit value.

15. The drive method of the DC brush motor according to claim 14, further comprising:
    storing, as basic data, timings for step-by-step dropping down the limit value and each of the limit value at the respective timings.

16. The drive method of the DC brush motor according to claim 15, further comprising:
    storing, as the basic data, initial data on a limit timing of turning into a state where the motor current is limited by the limit value and the limit value at the limit timing.

17. The drive method of the DC brush motor according to claim 16, further comprising:
    outputting a detection signal that indicates turning into the state where the motor current is limited by the limit value; and
    comparing a timing at which the detection signal is output and the limit timing in the initial data with each other to determine a state of the DC brush motor.

18. The drive method of the DC brush motor according to claim 16, further comprising:
    outputting a detection signal that indicates turning into the state where the motor current is limited by the limit value; and
    comparing a limit value at which the detection signal is output and a limit value at the limit timing in the initial data with each other to determine a state of the DC brush motor.

19. The drive method of the DC brush motor according to claim 14, further comprising:
    outputting a detection signal that indicates turning into the state where the motor current is limited by the limit value; and
    displaying, in response to the detection signal, the turning into the state where the motor current is limited by the limit value.

20. A drive method of a DC brush motor, the method comprising:
    limiting motor current at starting of a DC brush motor to a predetermined limit value;
    detecting a time interval during which the motor current is dropped down from a current value limited by the limit value to a predetermined reference value; and comparing the time interval with a predetermined reference time interval.

* * * * *